(12) United States Patent
Wang et al.

(10) Patent No.: US 10,372,155 B2
(45) Date of Patent: Aug. 6, 2019

(54) JOYSTICK AND RELATED CONTROL METHOD

(71) Applicant: PixArt Imaging Inc., Hsin-Chu (TW)

(72) Inventors: Wei-Chung Wang, Hsin-Chu (TW); Hsin-Chia Chen, Sunnyvale, CA (US); Hui-Hsuan Chen, Hsin-Chu (TW); Chao-Chien Huang, Hsin-Chu (TW); Chu-Hung Nien, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/681,415

(22) Filed: Aug. 20, 2017

(65) Prior Publication Data

US 2019/0056759 A1 Feb. 21, 2019

(51) Int. Cl.
*G05G 9/047* (2006.01)
*G06F 3/038* (2013.01)

(52) U.S. Cl.
CPC .............. *G05G 9/047* (2013.01); *G06F 3/038* (2013.01); *G05G 2009/04759* (2013.01)

(58) Field of Classification Search
None
See application file for complete search history.

(56) References Cited

U.S. PATENT DOCUMENTS

| | | | | |
|---|---|---|---|---|
| 4,782,327 A * | 11/1988 | Kley | ...................... | G05G 9/047 250/221 |
| 5,621,207 A * | 4/1997 | O'Mara | .................. | G05G 9/047 250/221 |
| 9,939,850 B2 * | 4/2018 | Hoellwarth | ....... | B29C 45/14639 |
| 2003/0083131 A1 * | 5/2003 | Armstrong | .............. | A63F 13/06 463/37 |
| 2005/0062721 A1 * | 3/2005 | Hsu | ..................... | G05G 9/04788 345/166 |
| 2005/0275623 A1 * | 12/2005 | Chadha | ................. | G06F 3/0312 345/156 |
| 2006/0003840 A1 * | 1/2006 | Bailey | ..................... | A63F 13/02 463/36 |
| 2006/0079328 A1 * | 4/2006 | Wang | ..................... | A63F 13/06 463/37 |
| 2007/0126700 A1 * | 6/2007 | Wright | .................. | G06F 3/0317 345/161 |
| 2007/0147731 A1 * | 6/2007 | Barrowclough | ......... | G02B 6/10 385/18 |
| 2008/0001918 A1 * | 1/2008 | Hsu | ........................ | G06F 3/011 345/157 |
| 2008/0016711 A1 * | 1/2008 | Baebler | .................. | G01B 7/012 33/559 |
| 2008/0192025 A1 * | 8/2008 | Jaeger | ................... | G06F 3/0421 345/173 |
| 2009/0201031 A1 * | 8/2009 | Morimoto | ............ | G01D 5/2417 324/661 |

(Continued)

*Primary Examiner* — Kent W Chang
*Assistant Examiner* — Nathaniel P Brittingham
(74) *Attorney, Agent, or Firm* — Winston Hsu

(57) ABSTRACT

A joystick has a related control method to provide displayed object control function. The joystick includes a body, an image sensor and a processor. The body has a deformable bottom surface whereon a pattern is disposed. The image sensor is disposed under the body and adapted to capture a plurality of frames about the pattern. The processor is electrically connected with the image sensor and adapted to generate a displayed object control signal according to pattern variation within the plurality of frames.

14 Claims, 10 Drawing Sheets

(56) References Cited

U.S. PATENT DOCUMENTS

| | | | | |
|---|---|---|---|---|
| 2010/0103140 A1* | 4/2010 | Hansson | ............... | G06F 3/0421 |
| | | | | 345/175 |
| 2010/0135534 A1* | 6/2010 | Weston | ................ | G01B 11/007 |
| | | | | 382/106 |
| 2011/0157056 A1* | 6/2011 | Karpfinger | ............ | G06F 3/0202 |
| | | | | 345/173 |
| 2011/0168874 A1* | 7/2011 | Phan Le | ............... | G01S 7/4811 |
| | | | | 250/208.6 |
| 2012/0001860 A1* | 1/2012 | Phan Le | ............... | G06F 3/0304 |
| | | | | 345/173 |
| 2012/0194457 A1* | 8/2012 | Cannon | .................. | G06F 3/011 |
| | | | | 345/173 |
| 2013/0069875 A1* | 3/2013 | Phan Le | ............... | G06F 3/0338 |
| | | | | 345/161 |
| 2015/0097775 A1* | 4/2015 | McCartney | ........... | G06F 3/0346 |
| | | | | 345/158 |
| 2015/0319821 A1* | 11/2015 | Yoshida | ................ | G06F 3/0321 |
| | | | | 315/152 |
| 2016/0030837 A1* | 2/2016 | Lin | ......................... | A63F 13/24 |
| | | | | 463/38 |
| 2016/0320875 A1* | 11/2016 | Yoshida | ................ | G06F 3/0321 |
| 2017/0038867 A1* | 2/2017 | Buckett | ................... | G06F 3/044 |
| 2017/0293371 A1* | 10/2017 | Yao | .......................... | G02B 1/10 |
| 2019/0056759 A1* | 2/2019 | Wang | ..................... | G05G 9/047 |

* cited by examiner

JOYSTICK AND RELATED CONTROL METHOD

BACKGROUND OF THE INVENTION

1. Field of the Invention

The present invention relates to a joystick and a related control method, and more particularly, to a joystick capable of providing displayed object control function and a related control method.

2. Description of the Prior Art

A conventional mechanical joystick includes a sensor, a trackball, a lever arm and a handle. A user presses the handle to move the lever arm, the lever arm can be inclined and rotated via the trackball, and the sensor detects motion of the trackball to control a cursor signal output by the mechanical joystick. The handle is made by solid material and can be pushed and pulled to recline the lever arm for generating the cursor signal. While the mechanical joystick is reclined, the lever arm can be rotated or slanted towards specially designated directions, and the trackball recovers the lever arm via a spring. Therefore, the conventional mechanical joystick is operated by limited gestures due to the designated directions, and may easily result in mechanical fatigue by long-term usage.

SUMMARY OF THE INVENTION

The present invention provides a joystick capable of providing displayed object control function and a related control method for solving above drawbacks.

According to the claimed invention, a joystick includes a body, an image sensor and a processor. The body has a deformable bottom surface whereon a pattern is disposed. The image sensor is disposed under the body and adapted to capture a plurality of frames about the pattern. The processor is electrically connected with the image sensor and adapted to generate a displayed object control signal according to pattern variation within the plurality of frames.

According to the claimed invention, a joystick includes a body, a capacitive sensor and a processor. The body has a deformable bottom surface with a plurality of conducting dots. The capacitive sensor is disposed under the body and adapted to detect a plurality of frames about the plurality of conducting dots. The processor is electrically connected to the capacitive sensor and adapted to generate a displayed object control signal according to variation of the plurality of conducting dots within the plurality of frames.

According to the claimed invention, a control method is capable of providing displayed object control function via a deformable bottom surface of a joystick. The control method includes acquiring a plurality of frames about the deformable bottom surface, identifying characteristics of a plurality of dots on the deformable bottom surface, and generating a displayed object control signal according to characteristics variation of the plurality of dots within the plurality of frames.

According to the claimed invention, a control method is capable of providing displayed object control function via a deformable bottom surface of a joystick. The control method includes acquiring a plurality of frames about the deformable bottom surface, identifying characteristics of a plurality of dots on the deformable bottom surface, setting a baseline when the plurality of dots remains stable in a predetermined number of frames, and generating a caution of changing the joystick when positions of the plurality of dots in a current frame exceeds a predetermined area.

The present invention disposes the pattern on the deformable bottom surface of the body, the pattern can be an asymmetric graffito, the plurality of colored dots or conducting dots, characteristics of the pattern can be varied in accordance with motion of the joystick, so that the characteristic variation can be transformed into the gesture applied to the joystick. The joystick and the related control method in the present invention have no drawback of the mechanical fatigue, and the joystick can read various gestures for preferred user experience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
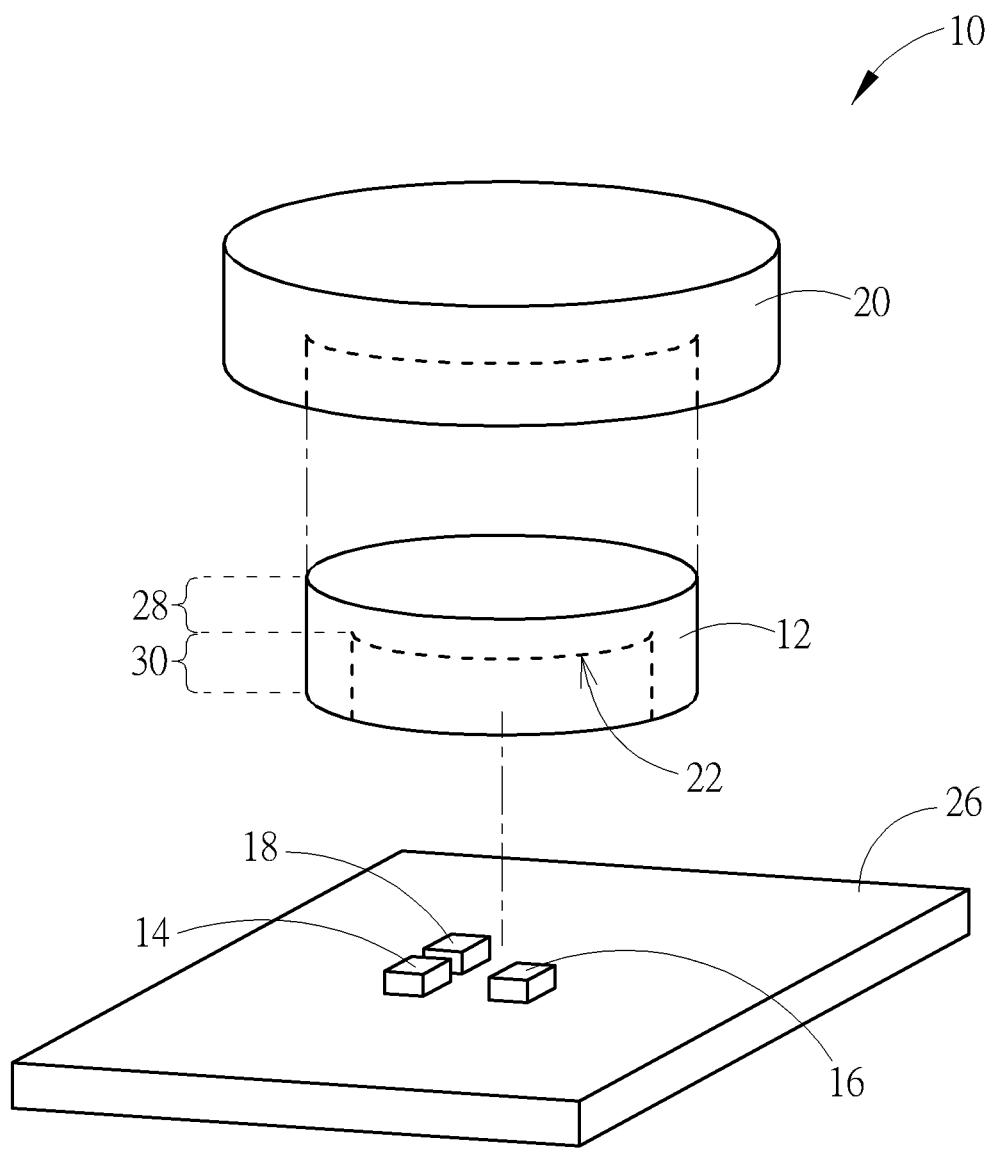
FIG. 1 is a diagram of a joystick according to a first embodiment of the present invention.
Figure 2:
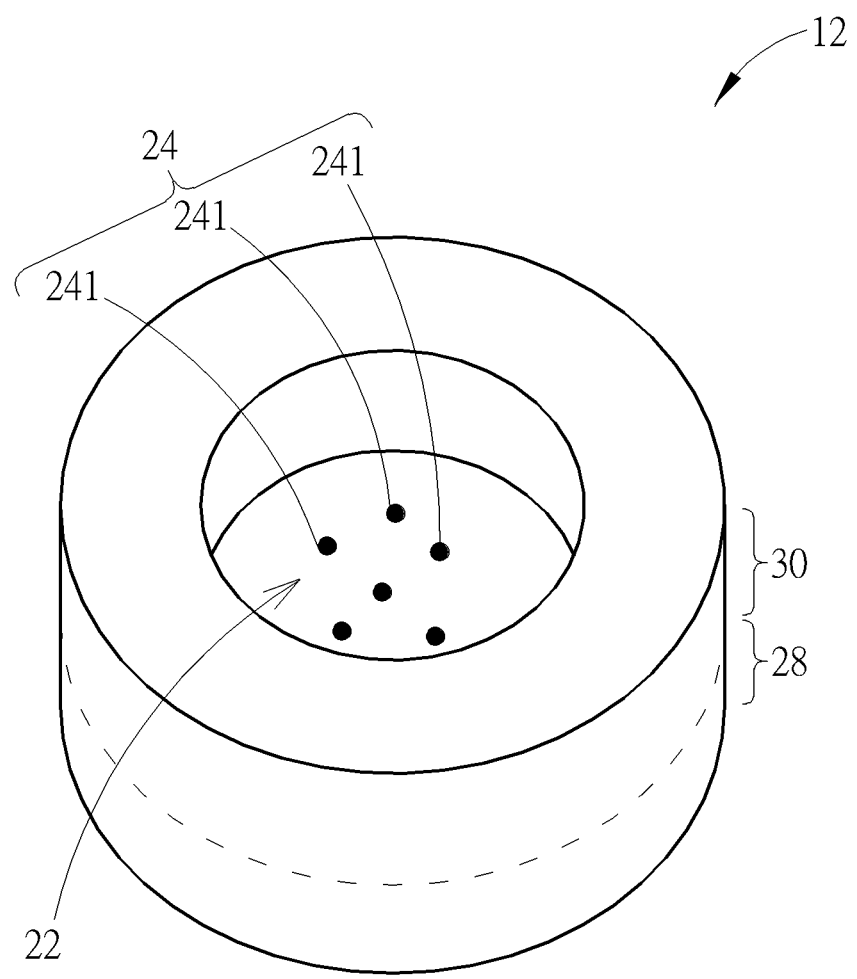
FIG. 2 is a diagram of a body of the joystick in a bottom view according to the first embodiment of the present invention.

Please refer to FIG. 1 and FIG. 2. FIG. 1 is a diagram of a joystick 10 according to a first embodiment of the present invention. FIG. 2 is a diagram of a body 12 of the joystick 10 in a bottom view according to the first embodiment of the present invention. The joystick 10 can include the body 12, an image sensor 14, a processor 16, a light source 18 and an opaque cover 20. The body 12 has a deformable bottom surface 22 whereon a pattern 24 is disposed. The image sensor 14 and the light source 18 are disposed on a circuit board 26 and located under the body 12. The light source 18 is an optional element adapted to project a beam onto the deformable bottom surface 22, and the image sensor 14 can capture a plurality of frames about the pattern 24. The opaque cover 20 is disposed above the body 12 for shelter and protection, and can be pressed and/or pushed by a user for operation of the joystick 10. The processor 16 is electrically connected with the image sensor 14 and the light source 18, and can generate a displayed object control signal while the joystick 10 is handled according to pattern variation within the plurality of frames, and the displayed object can be represented as a cursor displayed on a screen panel electrically connected with the joystick 10. Besides, the processor 16 can be optionally integrated with the image sensor 14 as a single chip, which depends on design demand.

The body 12 can include a top portion 28 and a support portion 30 connected with each other. The support portion 30 is set on the circuit board 26 to surround the image sensor 14, the processor 16 and the light source 18. The top portion 28 covers upon the support portion 30 so that the top portion 28 and the support portion 30 can be used to prevent the image sensor 14 from interference of environmental light, and can be touched by the user (for example: the body 12 may be pushed and pulled via the opaque cover 20); therefore, the top portion 28 can be shifted, lowered, pinched and rotated by deformation of the support portion 30, so that hardness of the top portion 28 is preferably greater than hardness of the support portion 30, and the support portion 30 is preferably made by resilient material. As shown in FIG. 2, the body 12 can be a hollow sunken structure, and the deformable bottom surface 22 is located on an inner of the top portion 28 of the hollow sunken structure. The pattern 24 is shifted, lowered, deformed and/or rotated in accordance with a movement of the body 12, and the processor 16 can analyze variation of the pattern 24 within the frames captured at different points in time to generate the displayed object control signal.

Figure 3A:
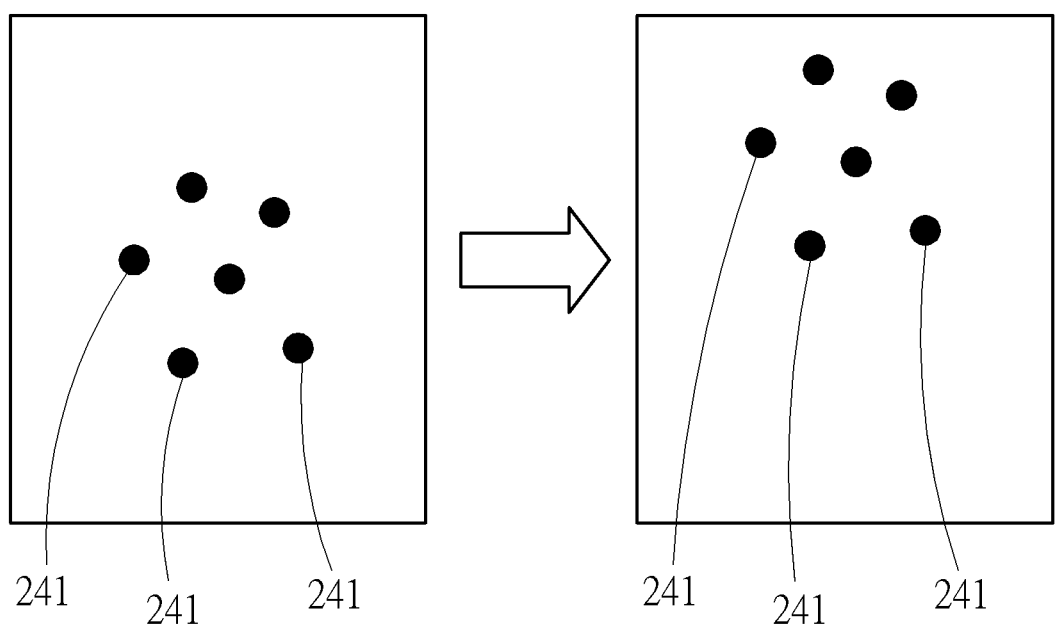
FIG. 3A, FIG. 3B, FIG. 3C and FIG. 3D respectively are diagrams of frames containing the dots varied by different gestures according to the first embodiment of the present invention.
Figure 3B:
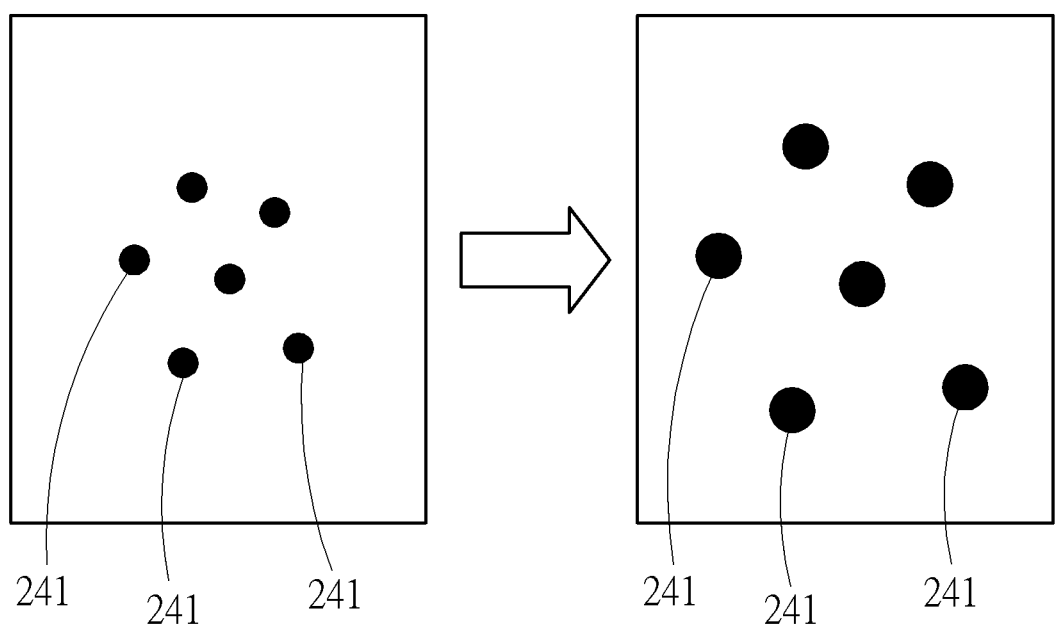
Figure 3C:
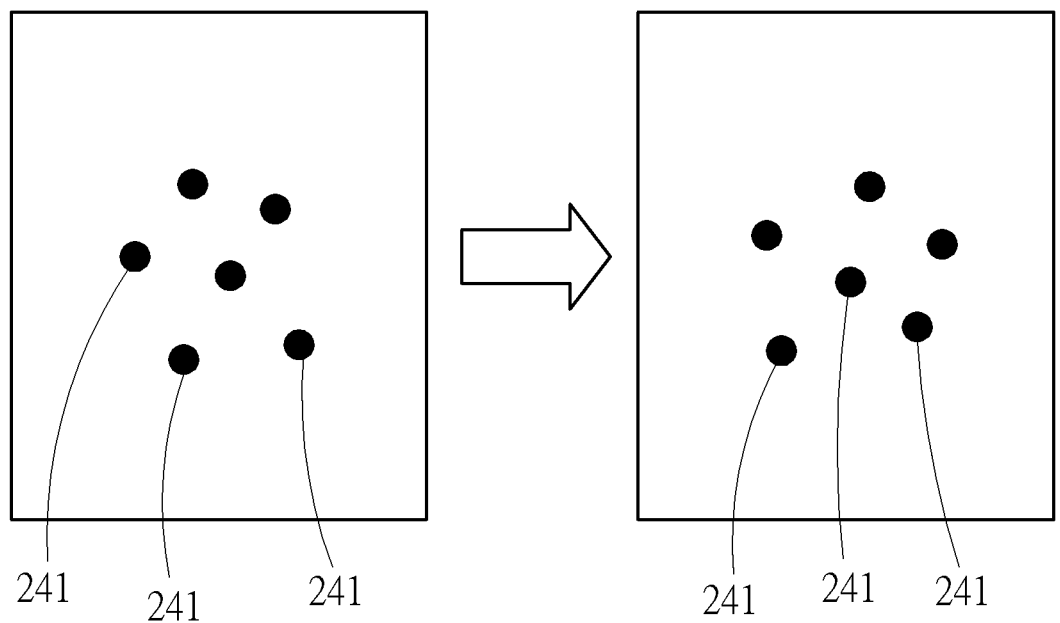
Figure 3D:
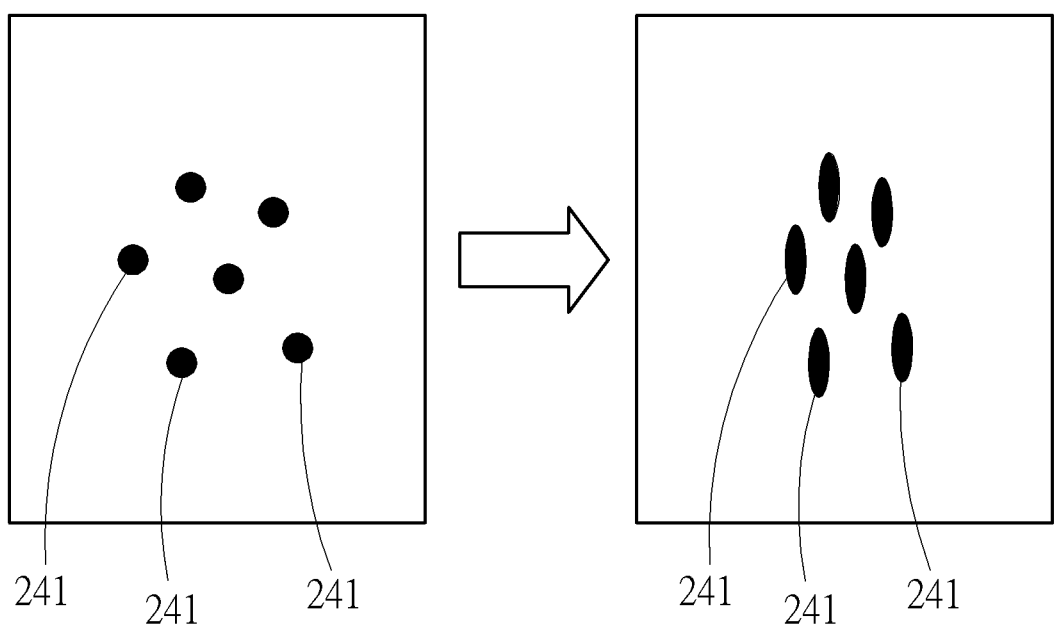

In the first embodiment, the pattern 24 can include a plurality of dots 241, the plurality of dots 241 can be arranged in asymmetry and made by high-reflective material, and variation of the dots 241 is utilized to analyze gesture of the user applied for the joystick 10. Please refer to FIG. 3A to FIG. 3D. FIG. 3A, FIG. 3B, FIG. 3C and FIG. 3D respectively are diagrams of frames containing the dots 241 varied by different gestures according to the first embodiment of the present invention. As shown in FIG. 3A, the dots 241 are shifted at a specific direction, which means the joystick 10 is pushed or pulled toward the specific direction accordingly. As shown in FIG. 3B, dimensions of the dots 241 are enlarged, which means the joystick 10 is pressed and lowered relative to the circuit board 26; accordingly, the joystick 10 may be determined as being lifted while the dots 241 are reduced. As shown in FIG. 3C, the dots 241 are twisted to represent rotation of the joystick 10; and as shown in FIG. 3D, the dots 241 are narrowed and widened to represent that the joystick 10 can be pinched.

Figure 4:
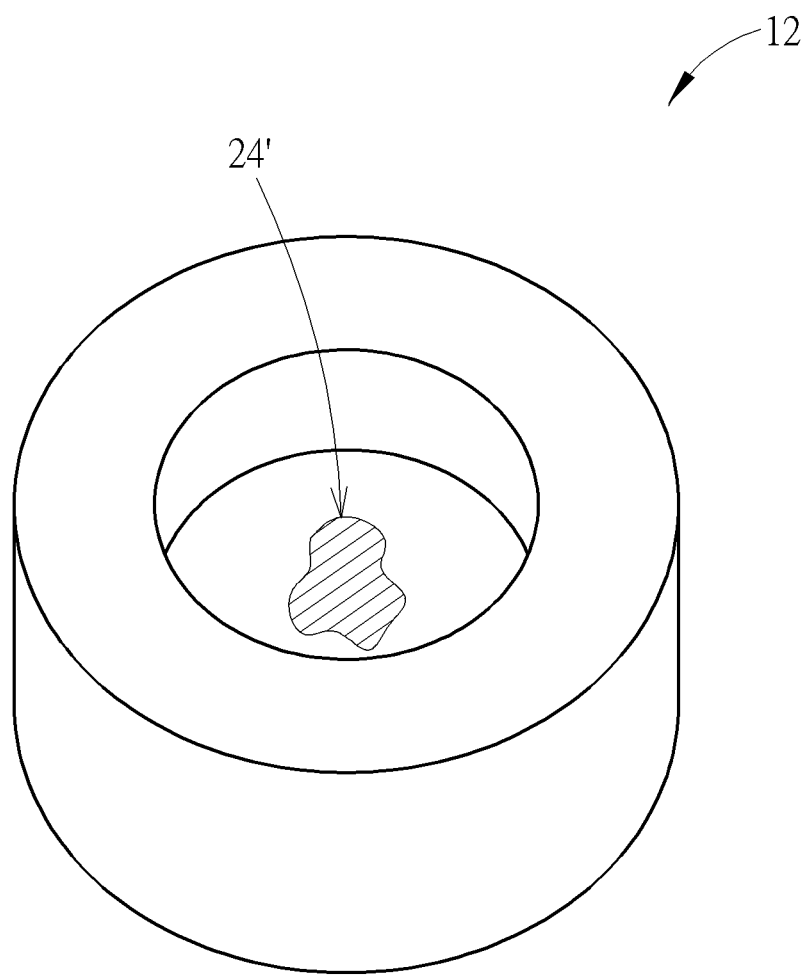
FIG. 4 is a diagram of the body in the bottom view according to a second embodiment of the present invention.

Please refer to FIG. 1 and FIG. 4. FIG. 4 is a diagram of the body 12 in the bottom view according to a second embodiment of the present invention. The body 12 of the joystick 10 can have a pattern 24' designed as an asymmetric form, rather than the plurality of dots. The pattern 24' can be the high-reflective material coated on the top portion 28 of the body 12. The pattern 24' can be shifted, scaled, rotated and/or deformed while the body 12 is handled by the user, such like the first embodiment shown in FIG. 3A to FIG. 3D, an outside contour of the dots can be viewed as the pattern 24', and the outside contour must be asymmetric to accurately identify reversed motion of the body 12. The image sensor 14 captures the plurality of frames containing variation of the pattern 24', and the processor 16 analyzes the frames to generate the displayed object control signal in accordance with the user's gesture.

Figure 5:
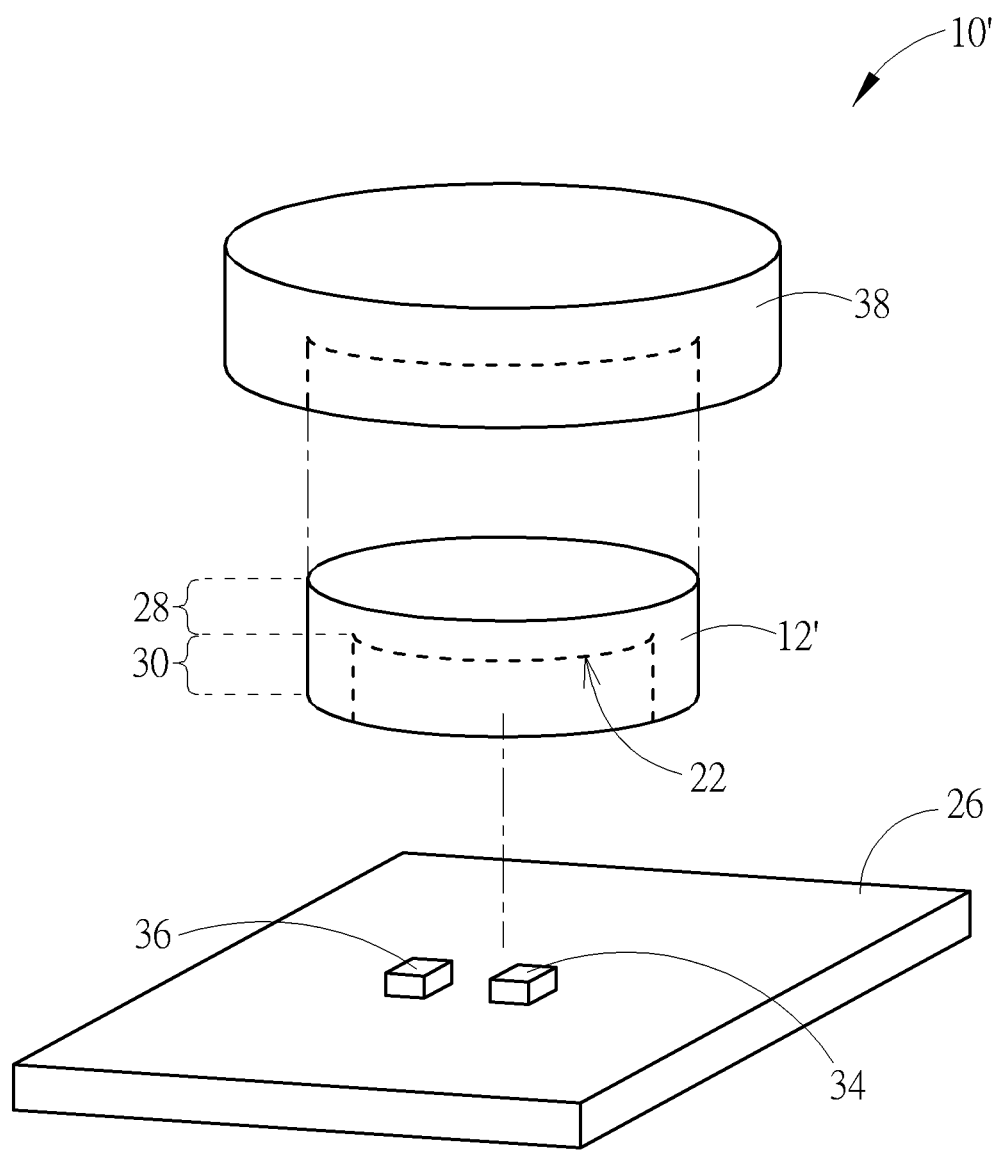
FIG. 5 is a diagram of the joystick according to a third embodiment of the present invention.
Figure 6:
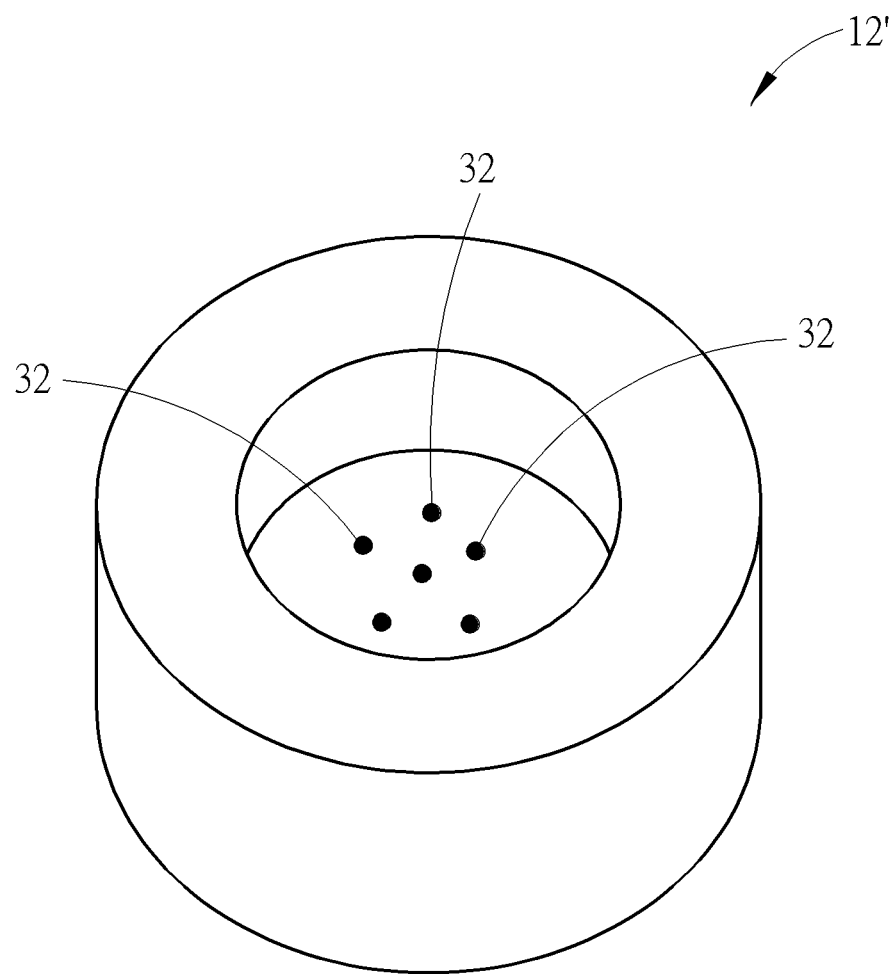
FIG. 6 is a diagram of the body of the joystick in the bottom view according to the third embodiment of the present invention.

Please refer to FIG. 5 and FIG. 6. FIG. 5 is a diagram of the joystick 10' according to a third embodiment of the present invention. FIG. 6 is a diagram of the body 12' of the joystick 10' in the bottom view according to the third embodiment of the present invention. In the third embodiment, elements having the same numeral as ones of the foresaid embodiments have the same structures and functions, and a detailed description is omitted herein for simplicity. The body 12' has the deformable bottom surface 22 whereon a plurality of conducting dots 32 is disposed. The body 12' can be the hollow sunken structure mainly composed of the top portion 28 and the support portion 30. The joystick 10' includes a capacitive sensor 34 and a processor 36 disposed under the body 12' and electrically connected each other, and further includes a cover 38 disposed above the body 12' for shelter and being the handle. Optical detection technology is not used in the joystick 10', so the cover 38 can be made by transparent material or opaque material.

In the third embodiment, the plurality of conducting dots 32 is arranged in asymmetry and electrified by an external power supply (not shown in the figures). While the joystick 10' is handled by the user to input the gesture, the body 12' is moved and/or deformed, an inductive capacitance value of each conducting dot 32 may be varied accordingly, the capacitive sensor 34 can acquire the plurality of frames after detection of the plurality of conducting dots 32, and each pixel of the frame can be represented as the inductive capacitance value of the related conducting dot 32; the conducting dot 32 may be optionally electrified and detection efficiency of the capacitive sensor 34 can increased adaptively for preferred performance. Thus, the processor 36 can analyze the plurality of frames to get variation of the inductive capacitance value about the plurality of conducting dots 32, so as to generate the displayed object control signal in accordance with the user's gesture.

Figure 7:
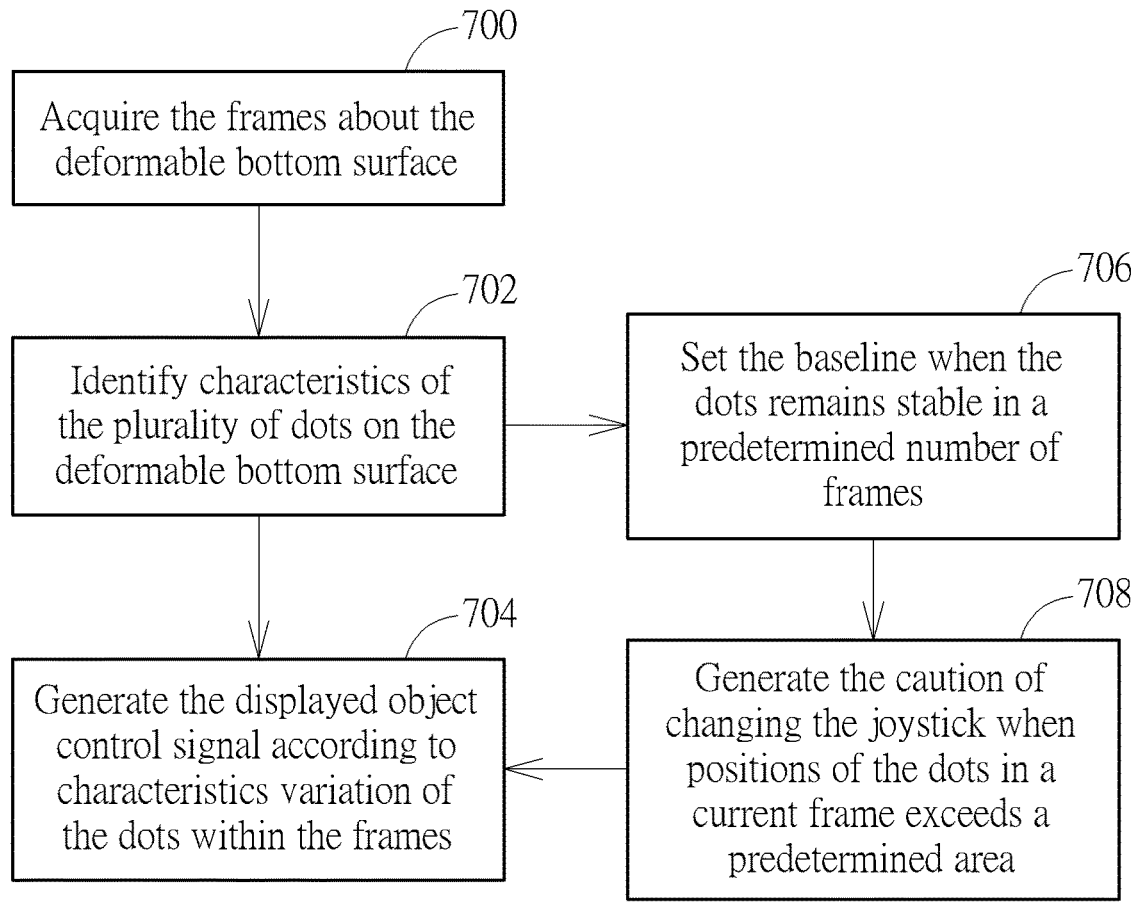
FIG. 7 is a flow chart of a control method for providing displayed object control function according to the embodiment of the present invention.

Please refer to FIG. 7. FIG. 7 is a flow chart of a control method for providing displayed object control function via the optical detection or capacitance detection technique according to the embodiment of the present invention. The following statement is an example of the first embodiment, and certainly the control method illustrated in FIG. 7 can be suitable for the joystick 10 and 10' shown in FIGS. 1-6. First, step 700 is executed to acquire the plurality of frames about the deformable bottom surface 22 by the image sensor 14 (or the capacitive sensor 34 is driven to capture the frames containing the conducting dots 32). While the joystick 10 is handled, characteristic of the dots 241 are varied to behave change of the pattern 24 and the deformable bottom surface 22. The said characteristic can be a value of the related pixel within the frame, and steps 702 and 704 are executed to identify the characteristic of the dots 241 for ascertaining operation of the joystick 10, and to generate the displayed object control signal according to the characteristics variation of the dots 241.

During operation of the joystick 10, the plurality of frames is captured continuously, and the processor 16 can compare difference of the characteristics variation between adjacent frames; for example, the processor 16 compares the characteristics variation of the dots 241 between a current frame and a previous frame or between the current frame and a next frame, so as to immediately compute the displayed object control signal. Further, the processor 16 may compare difference of the characteristics variation between the current frame and a preset frame, the preset frame is defined as a captured image about the deformable bottom surface 22 in the beginning, the difference between the current frame and the preset frame is computed to avoid invalid detection because of mechanical fatigue.

In addition, the control method can provide warning function to remind the user of replacing the damaged joystick 10. As shown in FIG. 7, steps 706 and 708 are optionally executed to set a baseline when the plurality of dots 241 remains stable in a predetermined number of frames, and to generate a caution of changing the joystick 10 when positions of the plurality of dots 241 in the current frame exceeds a predetermined area. The said baseline is a threshold utilized to check whether the joystick 10 is resiliently fatigued. The baseline can be a curve or a contour, and is defined in the beginning of the control method (before the mechanical fatigue is generated). Position of the plurality of dots 241 should be located inside the predetermined area formed by the baseline, the dots 241 exceeding the predetermined area means the mechanical fatigue being generated, so that the control method outputs the caution to remind replacement of the joystick 10.

The present invention disposes the pattern on the deformable bottom surface of the body, the pattern can be an asymmetric graffito, the plurality of colored dots or conducting dots, characteristics of the pattern can be varied in accordance with motion of the joystick, so that the characteristic variation can be transformed into the gesture applied to the joystick. The joystick and the related control method in the present invention have no drawback of the mechanical fatigue, and the joystick can read various gestures for preferred user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A joystick, comprising:
    a body having an enclosed space, and further having a deformable bottom surface whereon a pattern is disposed, wherein the pattern is deformable along with the deformable bottom surface;
    an image sensor disposed inside the enclosed space and adapted to capture a plurality of frames about the pattern;
    a processor electrically connected with the image sensor and adapted to generate a displayed object control signal for determining whether the joystick is pinched or operated by other gestures according to pattern variation within the plurality of frames; and
    a light source disposed under the body and adapted to project a beam onto the deformable bottom surface;
    wherein the body is a hollow sunken structure, the deformable bottom surface is located on an inner of a top portion of the hollow sunken structure.

2. The joystick of claim 1, wherein the pattern comprises a plurality of dots, the plurality of dots is arranged in asymmetry, and the displayed object control signal is generated according to position variation of the plurality of dots.

3. The joystick of claim 1, wherein the pattern is an asymmetric form, the displayed object control signal is generated according to deformation variation of the asymmetric form.

4. The joystick of claim 1, wherein the body comprises a top portion and a support portion connected with each other, and wherein a hardness of the top portion whereon the deformable bottom surface is located is greater than hardness of the support portion.

5. The joystick of claim 1, further comprising:
    an opaque cover disposed above the body for shelter.

6. The joystick of claim 1, wherein the processor compares continuous frames or compares a current frame with a preset frame to acquire the pattern variation.

7. The joystick of claim 1, wherein the displayed object control signal is a cursor control signal.

8. The joystick of claim 2, wherein the plurality of dots is made by high-reflective material.

9. A control method capable of providing displayed object control function via a deformable bottom surface of a joystick, the control method comprising:
    an image sensor of the joystick acquiring a plurality of frames about the deformable bottom surface;
    a processor of the joystick identifying characteristics of a plurality of dots on the deformable bottom surface; and
    the processor of the joystick generating a displayed object control signal for determining whether the joystick is pinched or operated by other gestures according to characteristics variation of the plurality of dots within the plurality of frames;
    wherein the deformable bottom surface is a part of a body having an enclosed space, the image sensor is disposed inside the enclosed space, a pattern is deformable along with the deformable bottom surface, a light source of the joystick is disposed under the body and adapted to project a beam onto the deformable bottom surface, the body is a hollow sunken structure, and the deformable bottom surface is located on an inner of a top portion of the hollow sunken structure.

10. The control method of claim 9, wherein the characteristics variation represents difference between continuous frames.

11. The control method of claim 9, wherein the characteristics variation represents difference between a current frame and a preset frame.

12. The control method of claim 9, wherein the plurality of dots is arranged in asymmetry, and the characteristics variation represents position variation of the plurality of dots.

13. The control method of claim 9, wherein the plurality of dots is conducting dots electrified by an external power supply, and the characteristics variation represents variation of an inductive capacitance value of each conducting dot.

14. The control method of claim 9, wherein the displayed object control signal is a cursor control signal.

* * * * *